United States Patent
Paige

(10) Patent No.: US 8,261,546 B1
(45) Date of Patent: Sep. 11, 2012

(54) DEAD STROKE REDUCTION VALVE

(75) Inventor: Ronald Dale Paige, Granger, IN (US)

(73) Assignee: Robert Bosch GmbH, Stuttgart (DE)

( * ) Notice: Subject to any disclaimer, the term of this patent is extended or adjusted under 35 U.S.C. 154(b) by 897 days.

(21) Appl. No.: 12/334,465

(22) Filed: Dec. 14, 2008

(51) Int. Cl.
B60T 11/16 (2006.01)
B60T 11/232 (2006.01)

(52) U.S. Cl. ................................ 60/562; 60/589
(58) Field of Classification Search ............ 60/562, 60/589
See application file for complete search history.

(56) References Cited

U.S. PATENT DOCUMENTS

| 3,659,421 A * | 5/1972 | Wilson et al. ............ 60/562 |
| 3,818,706 A * | 6/1974 | Gaiser ..................... 60/589 |
| 4,122,596 A | 10/1978 | Fields |
| 4,152,897 A * | 5/1979 | Falk ....................... 60/589 |
| 4,320,624 A | 3/1982 | Takeuchi |
| 4,338,787 A * | 7/1982 | Kawaguchi .............. 60/589 |
| 4,407,121 A * | 10/1983 | Crumb .................... 60/589 |
| 5,513,492 A | 5/1996 | Anderson |
| 5,943,863 A | 8/1999 | Jordan |
| 6,402,263 B1 * | 6/2002 | Wasson ................... 60/562 |
| 6,658,844 B1 | 12/2003 | Lammers |
| 6,817,179 B1 * | 11/2004 | Wasson et al. .......... 60/589 |
| 6,978,614 B2 | 12/2005 | Bourlon et al. |
| 7,040,093 B2 | 5/2006 | Legret et al. |

* cited by examiner

Primary Examiner — Thomas E Lazo
(74) Attorney, Agent, or Firm — Maginot, Moore & Beck

(57) ABSTRACT

A vehicle hydraulic master brake cylinder assembly (12) having a housing (14) with a cylindrical bore (16) for retaining primary (18) and secondary (20) pistons to define primary (26) and secondary (28) fluid pressure chambers. Primary (42) and secondary (44) reservoir pots are connected with primary (32, 34, 36, 80) and secondary (48, 50) conduits for respectively conveying hydraulic fluid between a fluid reservoir and the primary and secondary chambers. A valve (76) operates by the secondary piston (20) to selectively open and close communication between the primary pot (42) and the primary conduit. Upon closing the valve (76), a primary circuit dead stroke is reduced by allowing initial pressurized fluid to develop and be presented to a primary circuit flow path for the primary conduit (32, 34, 36, 80) prior to the closure of a poppet valve (30) closing communication between the primary pot (42) and the reservoir.

15 Claims, 2 Drawing Sheets

DEAD STROKE REDUCTION VALVE

BACKGROUND OF THE INVENTION

1. Field of the Invention

The present invention relates to vehicle braking systems and more particularly to an improved master cylinder arrangement for such braking systems.

2. Description of the Related Art

Vehicle hydraulic braking systems and the master cylinder designs utilized therein are old and well known and the in a simple form has a fluid reservoir located above a hydraulic chamber which is closed when one end by a spring biased movable piston moves past a port to pressurize fluid in the chamber. The master cylinder functions, upon mechanical actuation (often vacuum boosted) of the movable piston to supply brake applying fluid pressure to one or more vehicle wheel brake actuators. Relatively simple master cylinders are disclosed in U.S. Pat. Nos. 4,320,624 and 6,658,844. It is not uncommon to split vehicle hydraulic circuits into two or more nearly autonomous circuits with one circuit for actuating the front wheel brakes another circuit for actuating the rear wheel brakes. One way to effect such a split is to employ a single master cylinder of the tandem type having two separate, but contemporaneously actuable hydraulic chambers with separate fluid reservoirs or a single shared reservoir. Master cylinders having two separate chambers for two separate braking circuits are known as illustrated in many U.S. Patents including U.S. Pat. Nos. 4,122,596; 5,513,492 and 5,943,863.

The master cylinder disclosed in U.S. Pat. No. 5,943,863 has a housing with a bore therein connected by a radial port (for the primary circuit) and an axial port (for the secondary circuit) to a reservoir and to the brake system through first and second outlet ports. First and second pistons located in the bore are separated by a first return spring to define a first or primary chamber while the second piston is separated from the bottom of the bore by a second return spring to define a secondary chamber. The primary chamber is connected to the radial port through an axial passage in the second piston while the secondary chamber is directly connected to the axial port in the housing to communicate fluid between the reservoir and the bore. The first and second pistons respond to an input force by initially moving within the bore to compress the first and second return springs and allow the heads of linkage members or rods to engage and close normally open poppet valves to seal the axial passage to the radial port and the axial port in the housing thereby terminating communication between the bore and the reservoir. This initial movement for closing the reservoir poppet valves and start building pressure in the master cylinder produces no braking force and is known as dead stroke. More precisely, dead stroke (also called compensation loss) is the amount of primary piston travel required to isolate the reservoir low pressure circuit from the master cylinder high pressure circuit. The desirability of reducing this non-productive dead stroke has been recognized in several recent patents. Rather than axially located poppet valves, U.S. Pat. Nos. 6,978,614 B2 and 7,040,093 employ a pair of axially spaced apart cylinder sidewall seals which span a reservoir inlet port for each piston. Each piston has sidewall apertures which, when located intermediate the two seals, allow fluid flow from the reservoir into the respective pressure chambers.

U.S. Pat. No. 6,978,614 teaches one approach to reducing the dead stroke by employing a master cylinder having a bore in which axial primary and secondary cup-shaped pistons are slidingly fitted, and in which at least one sealing element is disposed in contact with each piston, in defining a supply chamber and a pressure chamber. Each piston comprises a bore, open in the direction of the front pressure chamber, and the secondary circuit piston comprises a valve-forming through-hole, opening into its periphery and into its bore, in order to isolate the front pressure chamber when it passes beyond the annular sidewall seal so as to produce a braking pressure. The front (secondary) pressure chamber associated with at least one piston comprises at least one tubular cylindrical element extending axially outside the piston and rearwards of the annular sidewall seal for the obturation of the through-hole thereby providing a reduced dead stroke. The annular element is interposed in order to seal off the radial valve before the latter passes the seal, U.S. Pat. No. 7,040,093 suggests several different sidewall aperture patterns to achieve such a desired result.

It is highly desirable to improve braking performance by minimizing the dead stroke and achieve such minimization in a manner easily adapted to current master cylinder designs.

SUMMARY OF THE INVENTION

The present invention discloses a master cylinder assembly that provides a dead stroke reduction during an initial actuation while allowing high flow capability and improved pedal feel for all modulation applications.

The vehicle hydraulic master brake cylinder assembly including a master cylinder housing with a generally cylindrical bore with primary and secondary pistons reciprocably disposed in the bore to defining primary and secondary brake fluid pressure chambers. Primary and secondary reservoir pots or ports connect with primary and secondary conduits for conveying hydraulic fluid between a fluid reservoir and the primary and secondary chambers. A valve includes a valve seat intermediate the primary port and primary conduit, a valve body having a valve face selectively sealingly engaging the valve seat, and a resilient member urging the face into sealing contact with the seat. The valve has an actuating arm extending into the bore for operation by the secondary piston for selectively opening and closing communication between the primary port and the primary conduit.

An advantage of the present invention is that the primary flow path may be increased for ESP applications without adversely affected pedal travel and pedal feel.

Another advantage is the present invention is compatible with current master cylinder designs and all bore diameters.

BRIEF DESCRIPTION OF THE DRAWINGS

Corresponding reference characters indicate corresponding parts throughout the several drawing views.

DETAILED DESCRIPTION OF THE INVENTION

Figure 1:
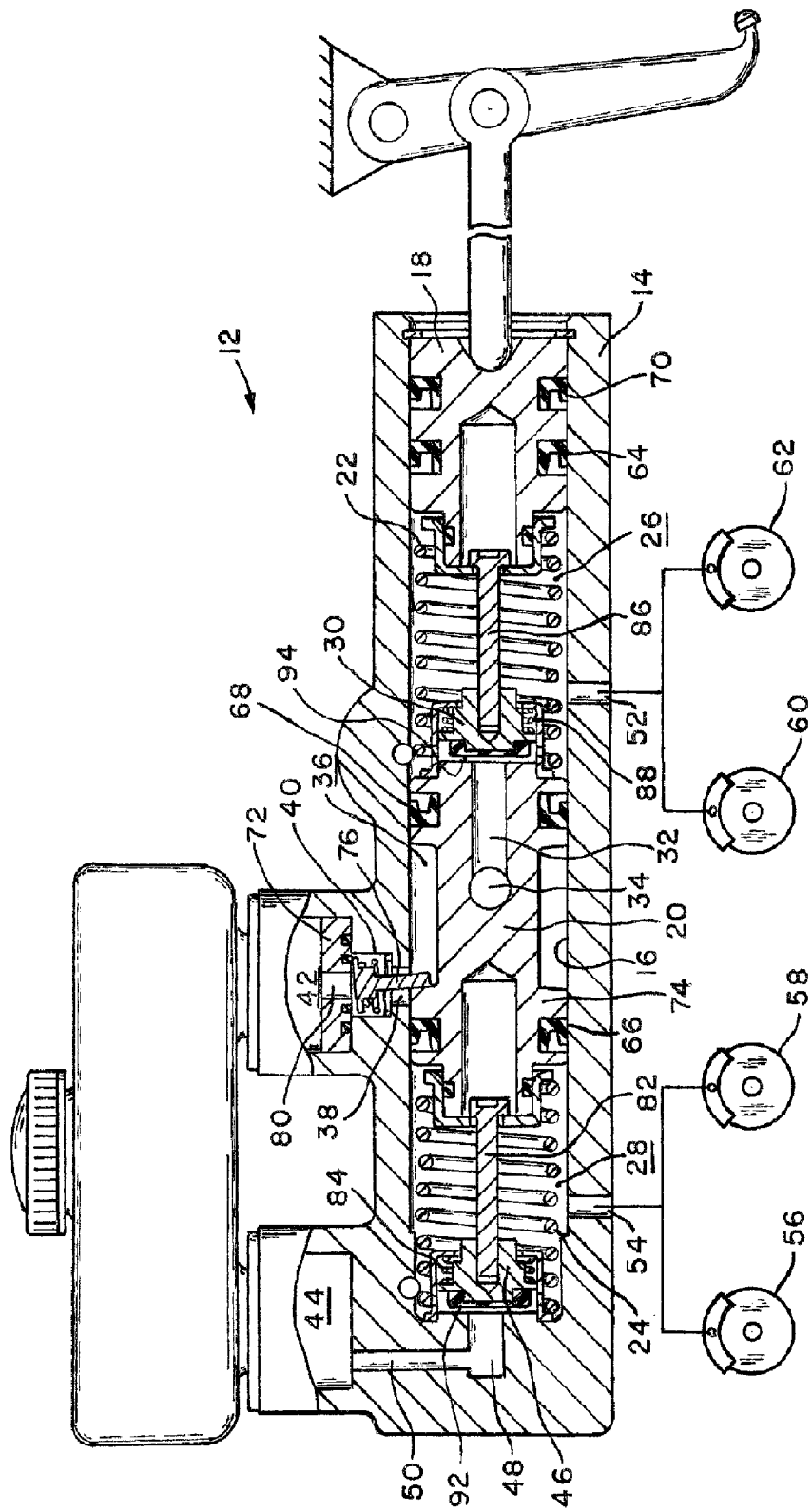
FIG. 1 is a cross-sectional view of a quiescent master cylinder incorporating the invention.

Referring now to the drawings and particularly to FIG. 1, there is shown a master cylinder 12 having structure similar to U.S. Pat. No. 5,943,863 wherein a body or housing 14 has a generally cylindrical bore 16 therein. A primary piston 18 and a secondary piston 20 are disposed within bore 16 and respectively biased toward the right as viewed by a primary return spring 22 and a secondary return spring 24. The first or primary piston 18 defines in conjunction with the secondary piston 20 and the bore 16, a first variable volume or pressure chamber 26 for a primary brake circuit while a second or secondary piston 20 defines in conjunction with the bore 16, a second variable volume or pressure chamber 28. Chamber 26 is connected by a fluid flow path including a normally open poppet valve 30, axial conduit 32, and a radial conduit 34 that extends generally orthogonally from the bore axis of annular chamber 26 and transverse cylindrical cavities 38 and 40 to primary pot or port 42 that is connected with a fluid reservoir (not shown) for maintaining a desires fluid level in the brake system primary circuit. Similarly, chamber 28 communicates with secondary pot or port 44 by way of secondary fluid flow path including normally open poppet valve 46, axial conduit 48 and radial conduit 50. The pressure chambers 26 and 28 are also connected by fluid flow paths including ports 52 and 54 to the front 56, 58 and to the rear 60, 62 wheel brake actuators to supply pressurized fluid to effect a brake application. The primary piston 18 has annular grooves for retaining a primary pumping seal 64 and a rear seal 70. Similarly, secondary piston 20 includes annular groves for a pumping seal 66 and a pressure seal 68 sealing therebetween the annular chamber 36.

Figure 2:
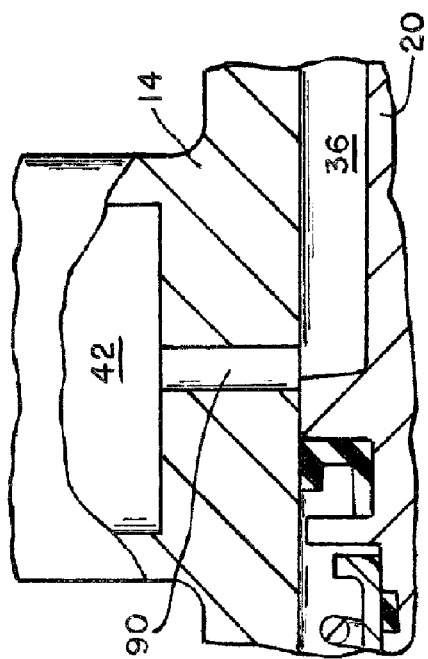
FIG. 2 is an enlarged cross-sectional view of a primary reservoir conduit portion of the master cylinder of FIG. 1.

Comparing FIGS. 1 and 2, poppet valve 46 in the secondary fluid flow path is actuatable by motion of the secondary piston 20 to selectively close the second fluid flow path and allow fluid pressure to build in the second chamber. As piston 20 translates toward the left as viewed, the rod 82 forces the valve against the bias of spring 84 to close the path. In addition to the poppet valve 30, the first or primary flow path includes a valve 76 which is biased by spring 78 into sealing engagement with a valve seat 72. However, in the quiescent state of the master cylinder as depicted in FIG. 1, this valve is held open in the tipped or skewed position of FIGS. 1 and 2 by a rim 74 on the secondary piston 20. Valve 76 is actuated (released) by motion of the second piston 20 toward the left as the pistons 18 and 20 translate together upon brake pedal depression to close the primary fluid flow path and allow fluid pressure to build in the primary chamber 26. Other valve configurations may be envisioned.

Figure 3:
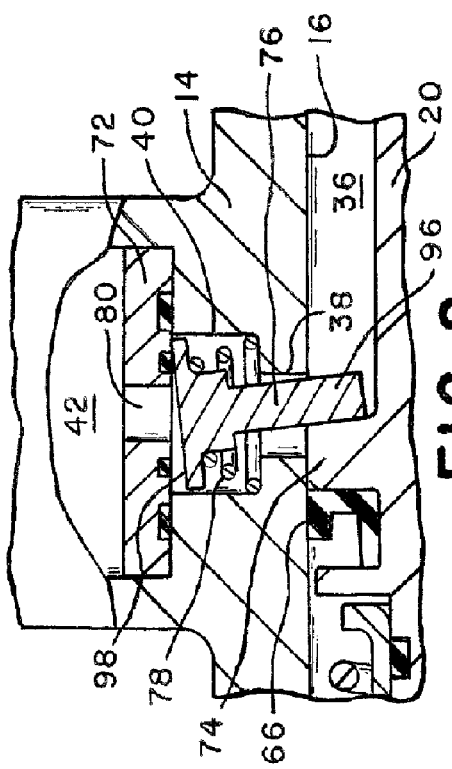
FIG. 3 is an enlarged cross-sectional view of the primary reservoir conduit portion of a prior art master cylinder.

FIG. 3 illustrates the primary fluid flow path for a prior art master cylinder. The path includes a pot or chamber 42 with a passageway 90 leading to the annular chamber 36. This path remains open upon brake pedal actuation until the initial travel of piston 18 is sufficient for rod 86 to engage and close poppet valve 30 against the urging of return spring 88. This initial travel is the dead stroke discussed earlier. The structure in FIG. 2 illustrates the relatively simple modifications necessary to adapt the prior art of FIG. 3 to define the present invention. The pot 42 which communicates with the fluid reservoir comprises a transverse cylindrical cavity in the housing or body 14. The primary conduit 90 is a simple transverse cylindrical bore opening into the annular cavity 36 of the master cylinder cylindrical bore 16. This passageway 90 is enlarged by partially boring cylindrical portion 40 of lesser diameter than the pot 42. A further cylindrical boring creates portion 38 forming the smallest diameter transverse cylindrical cavity which opens into the annular cavity 36 of the cylindrical bore 16. Spring 78 and valve 76 are positioned in cylindrical portion 40. A valve seat 72 is secured in the bottom of pot 42 at the junction between the pot and conduit 40 and functions as a dead stroke reduction valve retainer and seal. Seat 72 has a central opening 80 and is secured intermediate the primary pot 42 and primary conduit portions 40 and 38. The valve body 76 has a valve face 98 for selectively sealingly engaging the valve seat 72 and a valve stem or actuating arm 96 that extends away from the face into the cylindrical bore 16 for selective actuating engagement with a rib 74 on the secondary piston 20. The resilient member or spring 78 (such as a coil spring) is compressed between the valve face 98 and a ledge or shoulder 39 between bores 38 and 40 for urging the face 98 into sealing contact with the seat 72.

Figure 4:
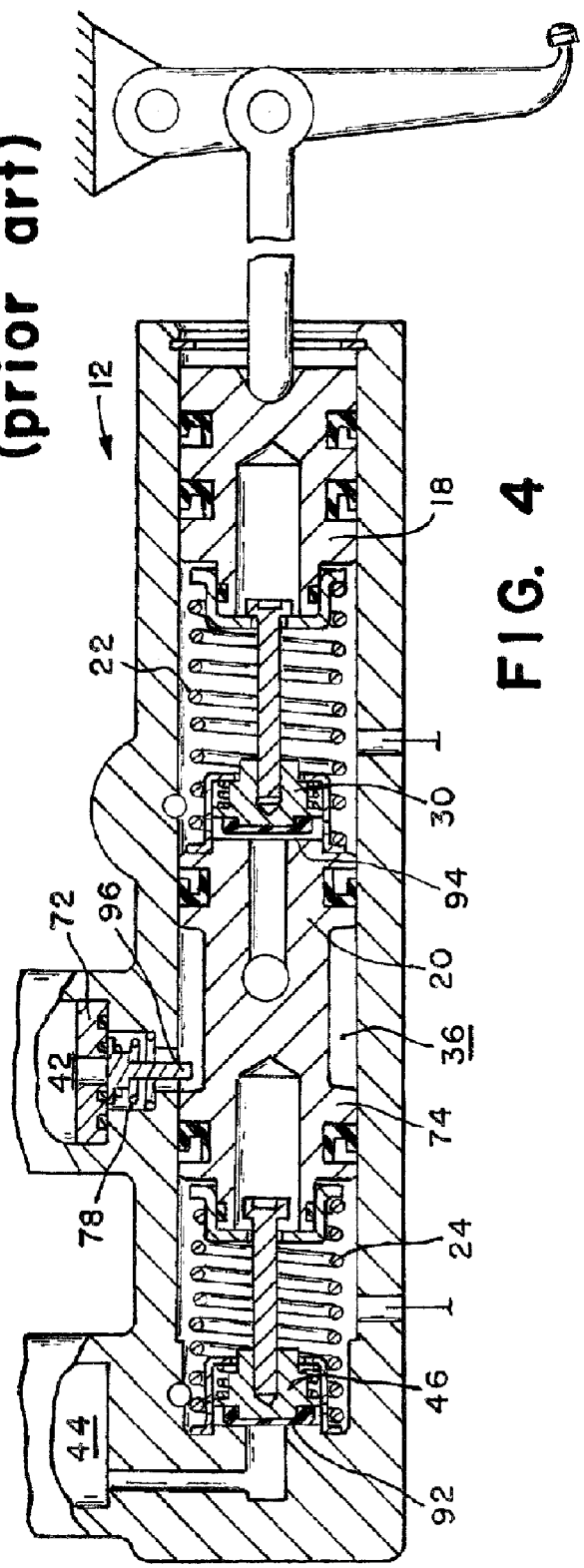
FIG. 4 is a cross-sectional view of the master cylinder of FIG. 1 with the pistons in the initial brake apply position.

FIG. 4 shows the master cylinder assembly of FIG. 1 after the vehicle brake pedal has been depressed somewhat (about 1.25 mm in one implementation). Poppet valve 30 has not yet been actuated and a primary gap 94 remains open. The secondary piston return spring 24 has a lower installed load than the primary return spring 22 so when the pedal is applied and the primary piston 18 begins to stroke forward, the load is transfer to the secondary piston 20. The secondary piston 20 moves forward which cause the secondary return spring 24 to compress. This allows the secondary poppet 46 to close gap 92 and seal off the secondary reservoir pot 44, thus allowing the secondary circuit to build pressure.

When the secondary piston 20 moves toward the left as viewed, rib 74 releases the valve arm 96 and valve 76 is urged by spring 78 into engagement with seat 72 closing off the primary reservoir pot 42. Closing off of the primary pot by the dead stroke reduction valve 76 enables the primary circuit to build pressure while the primary spring 22 is still compressing and poppet valve 30 is still open. This reduces the dead stroke in the primary circuit because pressure is starting to build in chamber 26 prior to closing the primary poppet 30. Without the dead stroke reduction valve 76 of the present invention, pressure will not build in the primary circuit until the primary poppet valve 30 closes. The poppet valve 30 is retained to address certain possible failure modes. There is no additional pressure increase in the annular chamber 36 once poppet valve 30 closes. The addition of the dead stroke reduction valve 76 allows the gaps 92 and 94 to be increased to improve flow without degrading pedal feel.

In summary, the primary 18 and secondary 20 pistons are initially simultaneously translated compressing the secondary return spring 24 closing the secondary poppet valve 46 to close the secondary circuit conduit, and releasing arm 96 allowing valve 76 to close the primary conduit. Both primary and secondary brake circuit pressure may then begin to build. Subsequent translation of the primary piston relative to the secondary piston and against primary return spring 22 bias closes the primary poppet valve 30 and increases the fluid pressure in the primary circuit. Continued translation of the primary and secondary pistons increases primary and secondary brake circuit pressure to arrest vehicle motion. The primary piston is released upon achieving a desired vehicle speed thereby relieving fluid pressure in the primary and secondary circuits.

What is claimed is:

1. A vehicle hydraulic master brake cylinder assembly, comprising:

a master cylinder housing having a generally cylindrical bore;

primary and secondary pistons are reciprocally disposed in the bore and defining in conjunction therewith primary and secondary brake fluid pressure chambers;

primary and secondary reservoir pots connecting with primary and secondary conduits configured to convey hydraulic fluid between a fluid reservoir and the primary and secondary chambers respectively; and a valve member movable between an open position in which the primary pot is in fluid communication with the primary conduit and a closed position in which the primary pot is isolated from fluid communication with the primary conduit, wherein the secondary piston is moveable between a first piston position and a second piston position, and wherein movement of the secondary piston from the first piston position to the second piston position causes said secondary piston to directly contact the valve member so as to move the valve member from the closed position to the open position.

2. The master brake cylinder assembly of claim 1, wherein the primary conduit comprises a fluid passageway extending generally orthogonally away from the cylindrical bore; and the valve comprises a valve seat intermediate the primary pot and primary conduit, a valve body having a valve face selectively sealingly engaging the valve seat, a valve actuating arm, and a resilient member urging the face into sealing contact with the seat.

3. The master brake cylinder assembly of claim 2, wherein the valve actuating arm extends away from the face into the cylindrical bore for selective actuating engagement with the secondary piston.

4. The master brake cylinder assembly of claim 1, wherein the primary pot comprises a transverse cylindrical cavity in the housing and the primary conduit comprises a fluid passageway of a lesser diameter transverse cylindrical cavity coupled by a smallest diameter transverse cylindrical cavity opening into the cylindrical bore.

5. The master brake cylinder assembly of claim 4, wherein the valve comprises a valve seat intermediate the primary pot and primary conduit, a valve body having a valve face selectively sealingly engaging the valve seat, a valve actuating arm extending away from the face into the cylindrical bore for selective actuating engagement with the secondary piston, and a resilient member urging the face into sealing contact with the seat.

6. A master cylinder for use in a vehicle brake system having individual front and rear wheel brake actuators, comprising:
 a master cylinder housing;
 a generally cylindrical bore in said housing;
 a fluid source in fluid communication with the bore;
 a first piston is reciprocally disposed in said bore;
 a second piston is reciprocally disposed in said bore;
 the first piston defining in conjunction with the second piston and the bore, a first variable volume chamber;
 the second piston defining in conjunction with the bore, a second variable volume chamber;
 said first and second chambers being connected by first and second fluid flow paths to receive fluid from the fluid source and maintain the fluid level in the brake system at a desired level, and being connected respectively to rear and front wheel brake actuators to supply pressurized fluid to effect a brake application;
 a poppet valve in the second fluid flow path and actuated by motion of the second piston for selectively closing the second fluid flow path to allow fluid pressure to build in the second chamber; and
 a valve member movable between an open position in which the fluid source is in fluid communication with the first fluid flow path and a closed position in which the fluid source is isolated from fluid communication with the first fluid flow path, the closed position allowing fluid pressure to build in the first variable chamber,
 wherein the second piston is moveable between a first position and a second position, and
 wherein movement of the second piston from the first position to the second position causes the second piston to directly contact the valve member so as to move the valve member from the closed position to the open position.

7. The master cylinder of claim 6, further comprising a first piston return spring for resiliently urging the first and second pistons axially away from one another, a second piston return spring for resiliently urging the second piston axially away from the poppet valve, the force required to overcome the urging of the first spring exceeding the force required to overcome the urging of the second spring.

8. The master cylinder of claim 6, further comprising a poppet valve in the first fluid flow path actuated by relative motion between the first and second pistons to selectively open and close the first fluid flow path, the poppet valve in the first fluid flow path normally closing after closure of the valve in the first fluid flow path.

9. The master cylinder of claim 6, wherein the first fluid flow path comprises a transverse cylindrical cavity in the housing and in communication with a fluid passageway of a lesser diameter that is transverse with the cylindrical cavity and coupled by a smallest diameter that is transverse with the cylindrical cavity and opens into the cylindrical bore.

10. The master cylinder of claim 6, wherein the valve comprises a valve seat intermediate the transverse cylindrical cavity and the fluid passageway, a valve body having a valve face for selectively engaging the valve seat to seal said first variable volume chamber, a valve actuating arm extending away from the face into the cylindrical bore for selective actuating engagement with the secondary piston, and a resilient member for urging the face into sealing contact with the seat.

11. A method of operating a vehicle master brake cylinder of the tandem type having primary and secondary brake circuits including primary and secondary pistons biased toward brakes released positions by primary and secondary return springs, and primary and secondary conduits for conveying hydraulic fluid between a fluid reservoir and the primary and secondary brake circuits respectively, comprising:
 simultaneously translating the primary and secondary pistons for compressing the secondary return spring and closing the primary conduit, the simultaneously translating the primary and secondary pistons occurring without compressing the primary return spring;
 translating the primary piston relative to the secondary piston and against the primary return spring bias to initially increase the fluid pressure in the primary circuit; and
 continuing to translate the primary and secondary pistons to increase primary and secondary brake circuit pressure to arrest vehicle motion.

12. The method of claim 11, wherein the master cylinder further includes primary and secondary poppet valves for selectively opening and closing the primary and secondary conduits respectively, the method further including the step of closing the primary poppet valve during the step of initially translating the primary piston relative to the secondary piston.

13. The method of claim 11, wherein the master cylinder further includes primary and secondary poppet valves for selectively opening and closing the primary and secondary conduits respectively, the method further including the step of closing the secondary poppet valve during the step of simultaneously translating the primary and secondary pistons.

14. The method of claim 13, further including the step of closing the primary poppet valve while performing the step of translating the primary piston relative to the secondary piston.

15. The method of claim 11, further including the step of releasing the primary piston upon achieving a desired vehicle speed thereby relieving fluid pressure in the primary and secondary brake circuits and reopening the primary and secondary conduits.

* * * * *